No. 728,173. PATENTED MAY 12, 1903.
C. LINDE.
APPARATUS FOR PRODUCING LOW TEMPERATURES, THE LIQUEFACTION
OF GASES, AND THE SEPARATION OF THE CONSTITUENTS
OF GASEOUS MIXTURES.
APPLICATION FILED JUNE 14, 1900.
NO MODEL.
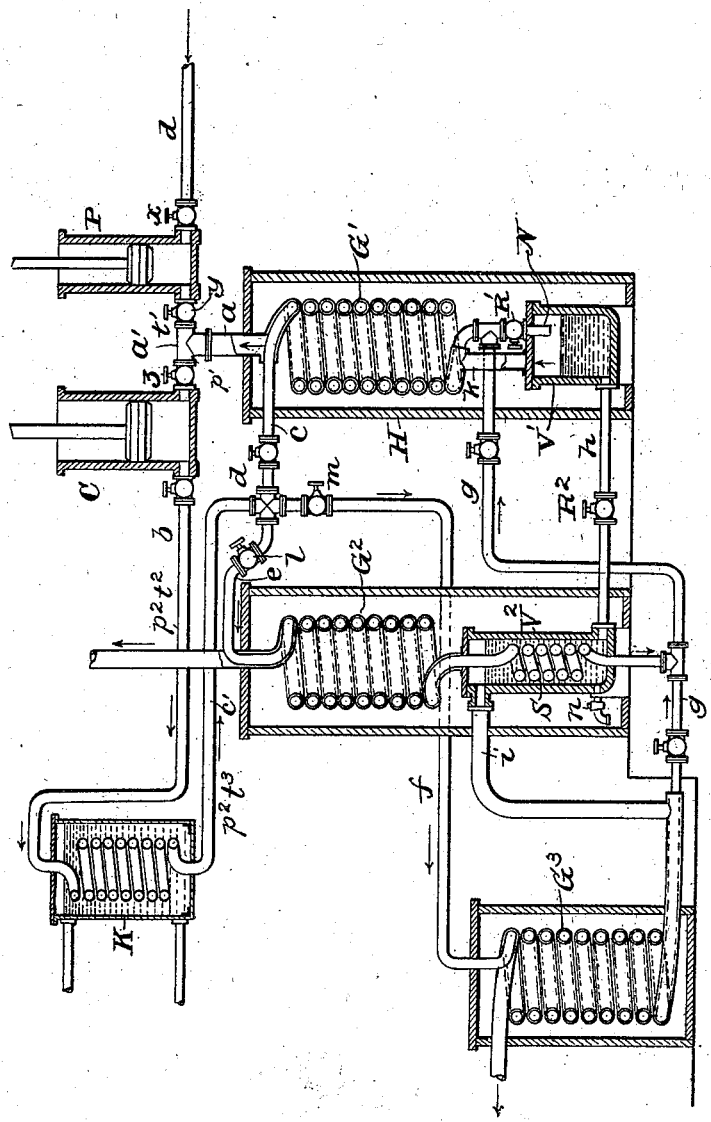
WITNESSES
INVENTOR
Carl Linde
By H. A. Seymour
Attorney No. 728,173.  
Patented May 12, 1903.

UNITED STATES PATENT OFFICE.

CARL LINDE, OF MUNICH, GERMANY, ASSIGNOR OF ONE-THIRD TO CHARLES F. BRUSH, OF CLEVELAND, OHIO.

APPARATUS FOR PRODUCING LOW TEMPERATURES, THE LIQUEFACTION OF GASES, AND THE SEPARATION OF THE CONSTITUENTS OF GASEOUS MIXTURES.

SPECIFICATION forming part of Letters Patent No. 728,173, dated May 12, 1903

Original application filed July 9, 1895, Serial No. 555,371. Divided and this application filed June 14, 1900. Serial No. 20,360. (No model.)

*To all whom it may concern:*

Be it known that I, CARL LINDE, of Munich, Kingdom of Bavaria, Germany, have invented certain new and useful Improvements in Apparatus for Producing Low Temperatures, the Liquefaction of Gases, and the Separation of the Constituents of Gaseous Mixtures; and I do hereby declare the following to be a full, clear, and exact description of the invention, such as will enable others skilled in the art to which it appertains to make and use the same.

My invention relates to an improvement in apparatus for producing low temperatures, the liquefaction of gases, and the separation of the constituents of gaseous mixtures, and is a division of application No. 555,371, filed July 9, 1895.

My invention is designed especially for the purpose of liquefying gases or mixtures of the same, such as atmospheric air, and also for separating the constituents of gaseous mixtures. The method of separating the components of atmospheric air is based upon a fact well known to physicists, that oxygen, although having a boiling-point higher than nitrogen, can only be liquefied simultaneously with the nitrogen or part of it, but that the nitrogen is first evaporated on volatilizing the liquefied mixture, so that the mixture will become richer in oxygen the longer the volatilization is continued.

The liquefaction of gases, such as atmospheric air, has hitherto been carried out by producing successive liquefaction and volatilization of liquids of gradually-increasing volatility, such as carbonic acid, nitrous oxid, ethelene, and the like. This method, however, has not proved capable of practical application for the purpose of attaining such low temperatures as that required for liquefying atmospheric air. My process for reaching such low temperatures is based upon the discovery made by Joule and Thomson more than forty years ago that atmospheric air when discharged through a valve from a space under high pressure into a space maintained at a lower pressure by causing the gas to pass off will have a lower temperature, the decrease $(T-T')$ of the temperature in degrees centigrade being expressed by the formula $$T - T' = \frac{p^2 - p'}{4}\left(\frac{289}{T}\right)^2,$$

where $p^2$ is the higher pressure, $p'$ the lower pressure in atmospheres, T the initial absolute temperature at higher pressure $p^2$, and $T'$ the absolute temperature at lower pressure $p'$. For the difference $(p^2 - p')$ of pressure of fifty atmospheres the difference of temperature is about 13° centigrade for T 283°, 14° for T 273°, 16.7° for T 250°, 26.1° for T 200°, and 40.70° for T 160°. I make use of this decrease in temperature for gradually reducing the temperature to the desired degree by establishing a constant forced circulation of the air between the high-pressure space and the low-pressure space, causing the incoming air at high pressure to be cooled by giving up its heat to the outgoing air at low pressure on its way to the compressor, and supplying additional air as required to keep up the pressure I am enabled to liquefy atmospheric air and to practically separate the oxygen from the nitrogen.

My invention will best be understood when described in connection with the annexed diagrammatic drawing, which represents one form of an apparatus.

In the drawing, C designates a compressor of suitable construction by which the air is received through the T $a'$ and valve $z$ at a pressure $p'$ and compressed to a pressure $p^2$, the temperature being raised from $t'$ to $t^2$, which temperatures, however, may vary within certain limits.

K is the refrigerator, into which compressed air of the temperature $t^2$ passes from the compressor through the valved pipe $b$ and has its temperature reduced to $t^3$, said refrigerator consisting of a coil cooled by suitable means, such as cold brine or liquid ammonia.

G' is a counter-current apparatus consisting, as shown in the drawing, of a coiled pipe within a larger coiled pipe or casing, so as to leave an outer annular channel between the pipes and a central channel. These pipes should be of great length—say one hundred meters—and should be surrounded by non-conducting material, such as sheep's wool, so as to prevent transfer of heat to the outside and between the windings. The drawing shows a casing H for holding the non-conducting material.

The upper end of the inner coiled tube of the counter-current apparatus G' is connected to the lower end of the coil of cooler K by a pipe $c c'$, while the discharge-pipe $b$ of the compressor C is connected to the upper end of the cooling-coil, by which means communication is established from the discharge-opening of the compressor C through the cooler K to the top of the inner channel of the counter-current apparatus G'. The top of the channel formed between the inner and outer coiled pipe of the apparatus G' is connected to the suction end of the compressor C by means of the pipe $a$, T $a'$, and valve $z$.

P is a primary compressor drawing air from the outside through a pipe $d$ and valve $x$ and delivering it to the suction of the compressor C through the T $a'$ and valve $y$ and $z$, its object being to supply air at the initial high pressure $p'$.

V' is a closed vessel beneath the counter-current apparatus, into which vessel projects a nozzle or expander N, attached to the lower end of the inner coiled pipe of the apparatus G', said nozzle being provided with a regulating-valve R'.

As shown in the drawing, the vessel V' at or near its top communicates with the lower part of the space between the inner and outer coiled tubes of the counter-current apparatus G' by a pipe $k$.

The apparatus as so far described has a low-pressure channel extending from the vessel V' through the space between the pipes of the apparatus G' to the suction of the compressor C and a high-pressure channel extending from the discharge-valve of the compressor C through the cooler K and through the inner channel of the counter-current apparatus G' to the regulating-valve R'.

The operation of the apparatus so far described is as follows: By the action of the air-compressors the proper pressures are established within the apparatus, the difference of pressure between the high and low pressure spaces being regulated by the valve R'. For liquefying atmospheric air I have found a pressure of twenty-five atmospheres in the low-pressure space and seventy-five in the high-pressure space very effective. I have also found that cooling the air which leaves the compressor to a temperature $t^3$ of about 10° centigrade, or less, to be sufficient. The compressed air at the higher pressure of seventy-five atmospheres discharged into the vessel V' against the initial pressure of twenty-five atmospheres maintained therein has its temperature lowered to $t^4$ and passing at the reduced pressure of twenty-five atmospheres through the counter-current apparatus G' it absorbs heat from the incoming air at seventy-five atmospheres, so that if the apparatus were working to perfection the air passing to the counter-current apparatus at a temperature $t^3$ will have its temperature reduced to $t^4$. The air from the bottom of the counter-current apparatus G' now reduced to $t^4$ being discharged against the lower pressure in the vessel V' has its temperature still further reduced to $t^5$, the values of $t^4$ and $t^5$ gradually decreasing until a temperature below the critical point is reached. In the counter-current apparatus G' the gas reduced to the lower pressure $p'$ and the gas at the higher pressure $p^2$ and temperature $t^3$ travel in opposite directions and on opposite sides along the inner coiled pipe, which is formed of conducting material, so as to effect an exchange of temperatures, whereby the temperature in the vessel V' is finally lowered to or below the critical point, whereupon air is liquefied and collects at the bottom of the vessel V'. When the critical point is reached, a condition of permanency is established, and while a certain portion of the circulating air is condensed in the vessel V' a corresponding volume of fresh air is supplied by the compressor P, so as to maintain pressures. While in starting the temperature of the air in the apparatus is gradually lowered, fresh air must also be supplied to keep up pressures. For further separating the nitrogen from the oxygen and for producing the latter also in the gaseous state when desired I use an evaporating vessel V$^2$ with an internal coil S and two counter-current apparatus G$^2$ and G$^3$, constructed similarly to G' of two coiled pipes, one within the other. A pipe $h$, with a regulating-valve R$^2$, connects the lower parts of the vessels V' and V$^2$. The upper end of the vessel V$^2$ is connected to the lower end of the outer tube of the counter-current apparatus G$^2$, at the upper end of which an outlet for gaseous nitrogen is provided. From near the top of the vessel V$^2$ a pipe $i$ leads to the lower end of the outer pipe of the counter-current apparatus G$^3$ in such a manner that the overflow from the vessel V$^2$ is trapped on its way to the apparatus G$^3$. Air at the pressure $p^2$ and temperature $t^3$ is led by the valved pipe $e$, connected to cross $d$, to the upper end of the inner pipe of the counter-current apparatus G$^2$ and thence to coil S and also to the inner pipe of apparatus G$^3$, through pipe $f$ and valve $m$, and is carried off from the lower ends of apparatus G$^3$ and of coil S by the pipe $g$ to the lower end of the inner pipe of the apparatus $g'$ above the regulating-valve R'. Within the vessel V$^2$ nitrogen is evaporated by heat abstracted from the air in coil S and is discharged through the upper end of the outer pipe of the apparatus G$^2$. The liquid oxygen flows from near the top of vessel V$^2$ to the counter-current apparatus G$^3$, where it is evaporated and discharged in gaseous form from top of the outer pipe. When oxygen is wanted in liquid form, the apparatus G³ is dispensed with and the liquid drawn from the lower part of the vessel V² through valve $n$. By the arrangement of the counter-current apparatus G² and G³ and by carrying the cooled air back above the valve R' the heat required for evaporating nitrogen and oxygen is abstracted from the incoming air, so as to practically reduce the work to be done by the machine to what is due to the losses. The low temperatures obtained in the counter-current apparatus G² and G³ may, however, be employed for other purposes.

Of course the apparatus shown and described may be greatly varied or modified, my invention not being restricted to any details of construction. Thus, for instance, the fractional distillation of the liquid may be effected directly within the vessel V' instead of V² by placing the coil S into V' and then allowing the more volatile gases to escape through the space between the outer and inner tubes of the apparatus G'. The remaining counter-current apparatus G' and G³ may be so combined that the transfer of heat from the compressed air is effected through a single supply-pipe, either by arranging three concentric tubes or by having two smaller tubes within a larger one. The gases leaving the apparatus may be repeatedly subjected to the process described to insure more perfect separation and purity. The compressors may be jacketed and cooled by water or cold brine, so that for small diameters and long strokes the air may be more or less cooled during compression. The modifications are readily understood without illustrations.

The word "condensation" as used in some of the claims means and comprehends the reduction of the volume of the gas to any desired degree.

Having fully described my invention, what I claim as new, and desire to secure by Letters Patent, is—

1. A counter-current and gas-liquefying apparatus consisting of a high-pressure conduit a gas compressor and cooler for maintaining a circulation of cooled compressed gas through the high-pressure conduit, an expansion-chamber, and a throttle or pressure-reducing valve, through which the compressed gas expands directly into said expansion-chamber, in combination with a low-pressure conduit connected at one end with said expansion-chamber, and adapted to conduct the expanded gas backwardly over and in direct contact with the high-pressure conduit and cause it to absorb heat to its fullest capacity from the compressed gas about to be expanded, substantially as set forth.

2. A liquefier for atmospheric air, consisting of a casing, a pipe in said casing, means for supplying compressed air to one end of said pipe, and an expander at the other end, the parts being so arranged that the air as it leaves the expander passes back over the pipe whereby upon continuous operation the air is liquefied, substantially as described.

3. A liquefier for atmospheric air provided with a pipe to which air under pressure is supplied combined with an expansion valve or nozzle and a casing or other means arranged to direct the flow from the valve or nozzle over or along the said pipe, substantially as described.

4. An apparatus for the separation of air into two parts, one rich in oxygen and the other poor in oxygen; and consisting of means for liquefying the air and subjecting the said liquid to fractional distillation by heat derived from compressed air about to be liquefied, substantially as described.

5. An apparatus for the separation of air into two parts, one rich in oxygen and the other poor in oxygen; and consisting of means for liquefying the air, means for subjecting the said liquid to fractional distillation by heat derived from compressed air about to be liquefied, and means for utilizing the distilled nitrogen to cool compressed air about to be liquefied, substantially as set forth.

6. An apparatus for the separation of air into two parts one rich in oxygen and the other poor in oxygen; and consisting of means for liquefying the air, means for subjecting the said liquid to fractional distillation by heat derived from compressed air about to be liquefied, and means for utilizing the distilled oxygen to cool air about to be liquefied, substantially as set forth.

7. An apparatus for liquefying gas comprising a compressor C, a refrigerator K for cooling the compressed gas, a counter-current apparatus G' having a high-pressure channel and a low-pressure channel in which the gas travels in opposite directions separated by heat-conducting material, the high-pressure channel being connected at its inlet to the discharge-pipe of the compressor through the refrigerator K, the low-pressure channel being connected at its outlet to the suction of compressor C, a collecting-chamber V', a valve R' connected with the discharge end of the high-pressure channel of the counter-current apparatus and adapted to permit of the discharge of the compressed gas from the high-pressure channel directly into the collecting-chamber V', and a connection $k$ between the collecting vessel V' and the inlet end of the low-pressure channel, whereby the expanded gas is conducted backwardly over and in direct contact with the high-pressure channel and caused to absorb heat to its fullest capacity from the compressed gas about to be expanded, substantially as set forth.

8. An apparatus for liquefying gas comprising a primary compressor P, a compressor adapted to receive, compress and circulate the gas supplied by compressor P, a refrigerator K for cooling the compressed gas, a counter-current apparatus G' having a high-pressure channel and a low-pressure channel in which the gas travels in opposite directions separated by heat-conducting material, the high-pressure channel being connected at its inlet to the discharge-pipe of the compressor through the refrigerator K, the low-pressure channel being connected at its outlet to the suction of compressor C, a collecting-chamber V', a valve R' connected with the discharge end of the high-pressure channel of the counter-current apparatus and adapted to permit of the discharge of the compressed gas from the high-pressure channel directly into the collecting-chamber V' and a connection $k$ between the collecting-chamber V' and the inlet end of the low-pressure channel, whereby the expanded gas is conducted backwardly over and in direct contact with the high-pressure channel and caused to absorb heat to its fullest capacity from the compressed gas about to be expanded, substantially as set forth.

9. An apparatus for liquefying gas embodying a primary compressor P for supplying gas at a comparatively low pressure a compressor C for compressing the gas to a high pressure; a refrigerator containing a coiled pipe connected at its upper end to the discharge-opening of the compressor C; a counter-current apparatus G' consisting of two concentric metallic pipes, spirally wound and forming an inner channel for the passage of gas at high pressure, and an outer annular channel for the gas at lower pressure; a closed collecting vessel V' beneath the counter-current apparatus; a valved nozzle N connected to the lower end of the inner channel of the counter-current apparatus and projecting into the vessel V'; a passage connecting the top of the vessel V' with the lower end of the annular channel of the counter-current apparatus; connections between the upper end of the high-pressure channel of the apparatus G' and the lower end of the refrigerator-coil and between the upper end of the annular channel of the apparatus G' and the compressor C; and a valved discharge at the bottom of the vessel V', substantially as described.

10. An apparatus for liquefying and separating gases consisting of a primary compressor P; a compressor C arranged to receive and compress circulating gas, and fresh gas, or both; a refrigerator K connected at its top with the discharge-opening of the compressor C; a counter-current apparatus with high and low pressure channels separated by conducting material; a closed collecting vessel V'; a valved nozzle N connected at its top with the lower end of the high-pressure channel of the counter-current apparatus; a connecting-channel $k$ between the top of the collecting vessel V' and the lower end of the low-pressure channel of the counter-current apparatus; pipe connections between the upper end of the high-pressure channel of the apparatus G' and the lower end of the refrigerator, and between the upper end of the low-pressure channel and the compressor C; an evaporating vessel $V^2$; a valved pipe connection $h$ from the bottom of the vessel V' to the bottom of the vessel $V^2$; a coil S within the vessel $V^2$; a valved pipe connection $g$ from above the valve R' to the lower end of the coil S, the upper end of the coil S being connected to the lower end of the inner channel of the counter-current apparatus $G^2$; a valved pipe connection from the upper end of the inner channel of the counter-current apparatus $G^2$ to the compressor C and a discharge-pipe from the upper end of the outer channel, substantially as specified.

11. In an apparatus for liquefying and separating gases, the combination of the compressors P and C, refrigerator K, counter-current apparatus G' and $G^2$, collecting vessel V', evaporating vessel $V^2$ with coil S, jet-nozzle N and connections substantially as shown and described, of a counter-current apparatus $G^3$ having the upper end of its inner channel connected with the supply of compressed gases through the pipe $f$ and valve $m$ and the lower end of said channel connected to the valved pipe $g$ and thence to the expansion-nozzle N also, a pipe connection from the lower end of the outer channel of apparatus $G^3$ to the upper end of the vessel $V^2$, and a discharge-pipe from the upper end of the outer channel of $G^3$, substantially as described.

12. An apparatus for the separation of air into two parts, one rich in oxygen and the other poor in oxygen; and consisting of means for liquefying the air and subjecting the said liquid to fractional distillation by heat derived from previously-cooled air undergoing condensation at a higher pressure.

13. An apparatus for the separation of air into two parts, one rich in oxygen and the other poor in oxygen; and consisting of means for liquefying the air, means for subjecting the said liquid to fractional distillation by heat derived from previously-cooled air undergoing condensation at a higher pressure, and means for wholly or partly maintaining the supply of said liquid by liquid air thus produced.

14. An apparatus for the separation of air into two parts, one rich in oxygen and the other poor in oxygen; and consisting of means for liquefying the air, means for subjecting the said liquid to fractional distillation by heat derived from previously-cooled air undergoing condensation at a higher pressure, and means for utilizing the products of distillation to cool air about to be liquefied.

In testimony whereof I have signed this specification in the presence of two subscribing witnesses.

CARL LINDE.

Witnesses:
  FLORENCE T. MCDONALD,
  ANDREAS SORG.